(12) United States Patent
Vankamamidi et al.

(10) Patent No.: US 11,321,169 B2
(45) Date of Patent: May 3, 2022

(54) END-TO-END DATAPATH PROTECTION

(71) Applicant: EMC IP Holding Company LLC, Hopkinton, MA (US)

(72) Inventors: Vamsi K. Vankamamidi, Hopkinton, MA (US); Philippe Armangau, Acton, MA (US); Geng Han, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/945,358

(22) Filed: Jul. 31, 2020

(65) Prior Publication Data
US 2022/0035698 A1 Feb. 3, 2022

(51) Int. Cl.
*G06F 11/10* (2006.01)
*G06F 11/07* (2006.01)
*G06F 11/14* (2006.01)
*G06F 9/46* (2006.01)
*G06F 3/06* (2006.01)
*G06F 9/30* (2018.01)

(52) U.S. Cl.
CPC ........ *G06F 11/1044* (2013.01); *G06F 3/0619* (2013.01); *G06F 3/0641* (2013.01); *G06F 3/0656* (2013.01); *G06F 3/0659* (2013.01); *G06F 3/0689* (2013.01); *G06F 9/30047* (2013.01); *G06F 9/467* (2013.01); *G06F 11/073* (2013.01); *G06F 11/1004* (2013.01); *G06F 11/1076* (2013.01); *G06F 11/1435* (2013.01)

(58) Field of Classification Search
CPC .... G06F 3/0619; G06F 3/0641; G06F 3/0656; G06F 3/0659; G06F 3/068; G06F 11/1044; G06F 11/11–106; G06F 11/1004
See application file for complete search history.

(56) References Cited

U.S. PATENT DOCUMENTS

| 9,280,578 B1 | 3/2016 | Zhou et al. |
| 9,779,105 B1 | 10/2017 | Bono et al. |
| 9,916,191 B1 | 3/2018 | Pan et al. |
| 9,916,244 B1 | 3/2018 | Tolvanen et al. |
| 10,230,785 B1* | 3/2019 | Gadalin ............... H04L 67/1097 |
| 11,086,713 B1* | 8/2021 | Sapuntzakis .......... G06F 3/0673 |
| 2013/0179759 A1* | 7/2013 | Aronovich .......... G06F 11/1004 714/807 |
| 2020/0133774 A1 | 4/2020 | Kang et al. |
| 2021/0049062 A1* | 2/2021 | Balakrishnan ...... G06F 11/0772 |
| 2021/0141685 A1* | 5/2021 | Li ....................... G06F 11/1044 |

OTHER PUBLICATIONS

"Disk buffer—Wikipedia"; dated May 12, 2020; downloaded from Wikipedia.org at https://en.wikipedia.org/w/index.php?title=Disk_buffer&oldid=956217086; 5 pages.

* cited by examiner

Primary Examiner — Shelly A Chase
(74) Attorney, Agent, or Firm — BainwoodHuang

(57) ABSTRACT

A technique of protecting data in a data storage system includes, in response to receiving a write request that specifies data to be written in the data storage system, calculating an error detection code (EDC) of the specified data. The technique further includes persisting the specified data and the EDC in persistent cache and, in response to receiving a read request for reading the specified data, validating the specified data using the EDC before returning the specified data in satisfaction of the read request.

20 Claims, 8 Drawing Sheets

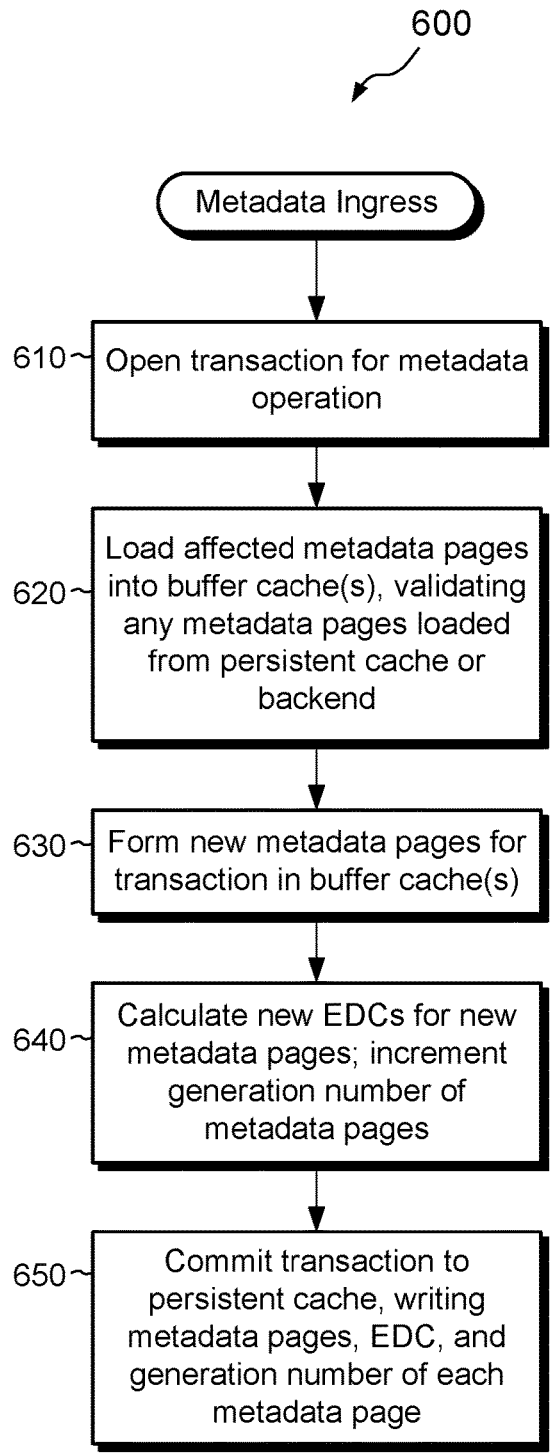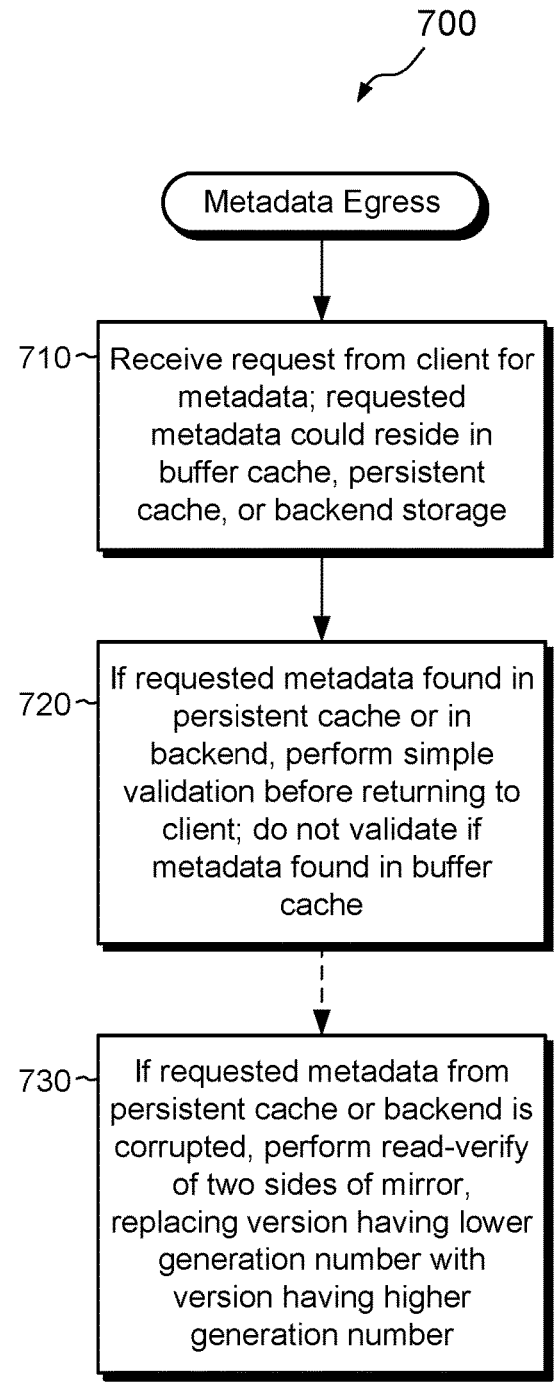
FIG. 6
FIG. 7

END-TO-END DATAPATH PROTECTION

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host applications ("hosts"), which specify blocks, files, and/or other data elements to be written, read, created, deleted, and so forth. Software running on the storage processors manages incoming storage requests and performs various processing tasks to organize and secure the data elements on the non-volatile storage devices.

Some storage systems use validation to ensure that data remains error-free while the data is being stored and managed. For example, a storage system might calculate a checksum on a data block prior to storing the data block on disk. The checksum may be stored with the data (e.g., as part of a header) or elsewhere in the storage system, such as at a separate location associated with the data block. When the data block is later read from disk, e.g., in response to a read request from a host, the storage system may validate the data by calculating a new checksum on the data and comparing the new checksum with the previously-stored checksum. If the two checksums match, the storage system returns the requested data to the requestor, e.g., the host, as the match confirms to a high level of confidence that the data has not changed. If the checksums do not match, the storage system may initiate an error handler, which attempts to repair the error or remediate its effects.

SUMMARY

Unfortunately, conventional schemes for data validation can be inefficient and computationally burdensome. For example, calculating a checksum may involve reading an element of data into local memory of a CPU (central processing unit) and executing an algorithm on the data. It is therefore not unusual for a single checksum validation to consume hundreds of CPU clock cycles. Moreover, some prior schemes implement checksum validation every time data is accessed, or nearly every time, multiplying the performance impact. Further still, continuing improvements in the speed of disk drives and other storage media means that CPU-based delays, which may have been considered negligible in the past, now present significant bottlenecks to performance. What is therefore needed is a smarter, more efficient approach to data validation in a storage system.

An improved technique addresses this need in whole or in part by calculating a checksum or other error-detection code (EDC) on data upon data ingress, e.g., in response to the storage system processing a write request, and validating the data using the EDC upon data egress, e.g., in response to the storage system processing a read request. The improved technique applies protection to data at its point of entry and validates the data using the applied protection at its point of exit, ensuring that the data returned in response to the read request is free of errors.

In some examples, additional validation is performed when flushing data to backend storage, such as solid-state drives (SSDs) and/or magnetic disk drives (HDDs).

In some examples, similar validation is applied to metadata, which the storage system creates rather than receives. For example, the improved technique calculates an EDC on a metadata element when writing the metadata element to persistent storage and validates the metadata element using the EDC when reading the metadata element from persistent storage.

According to some examples, validation of data and metadata is avoided when processing the data and metadata in memory, but rather is limited to egress (for data) and to certain transfers from one type of storage medium to another.

Certain embodiments are directed to a method of protecting data in a data storage system. The method includes, in response to receiving a write request that specifies data to be written in the data storage system, calculating an error detection code (EDC) of the specified data. The method further includes persisting the specified data and the EDC in persistent cache and, in response to receiving a read request for reading the specified data, validating the specified data using the EDC before returning the specified data in satisfaction of the read request.

Other embodiments are directed to a computerized apparatus constructed and arranged to perform a method of protecting data, such as the method described above. Still other embodiments are directed to a computer program product. The computer program product stores instructions which, when executed on control circuitry of a computerized apparatus, cause the computerized apparatus to perform a method of protecting data, such as the method described above.

The foregoing summary is presented for illustrative purposes to assist the reader in readily grasping example features of the instant disclosure; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

FIG. 6 is a flowchart showing an example method of managing metadata ingress in the environment of FIGS. 1 and 2.

FIG. 7 is a flowchart showing an example method of managing metadata egress in the environment of FIGS. 1 and 2.

DETAILED DESCRIPTION

Embodiments of the improved technique will now be described. One should appreciate that such embodiments are provided by way of example to illustrate certain features and principles but are not intended to be limiting.

An improved technique for data validation in a data storage system includes calculating a checksum or other error-detection code (EDC) on data upon data ingress, e.g., in response to the storage system processing a write request, and validating the data using the EDC upon data egress, e.g., in response to the storage system processing a read request. The improved technique applies protection to data at its point of entry and validates the data using the applied protection at its point of exit, ensuring that the data returned in response to the read request is free of errors.

Figure 1:
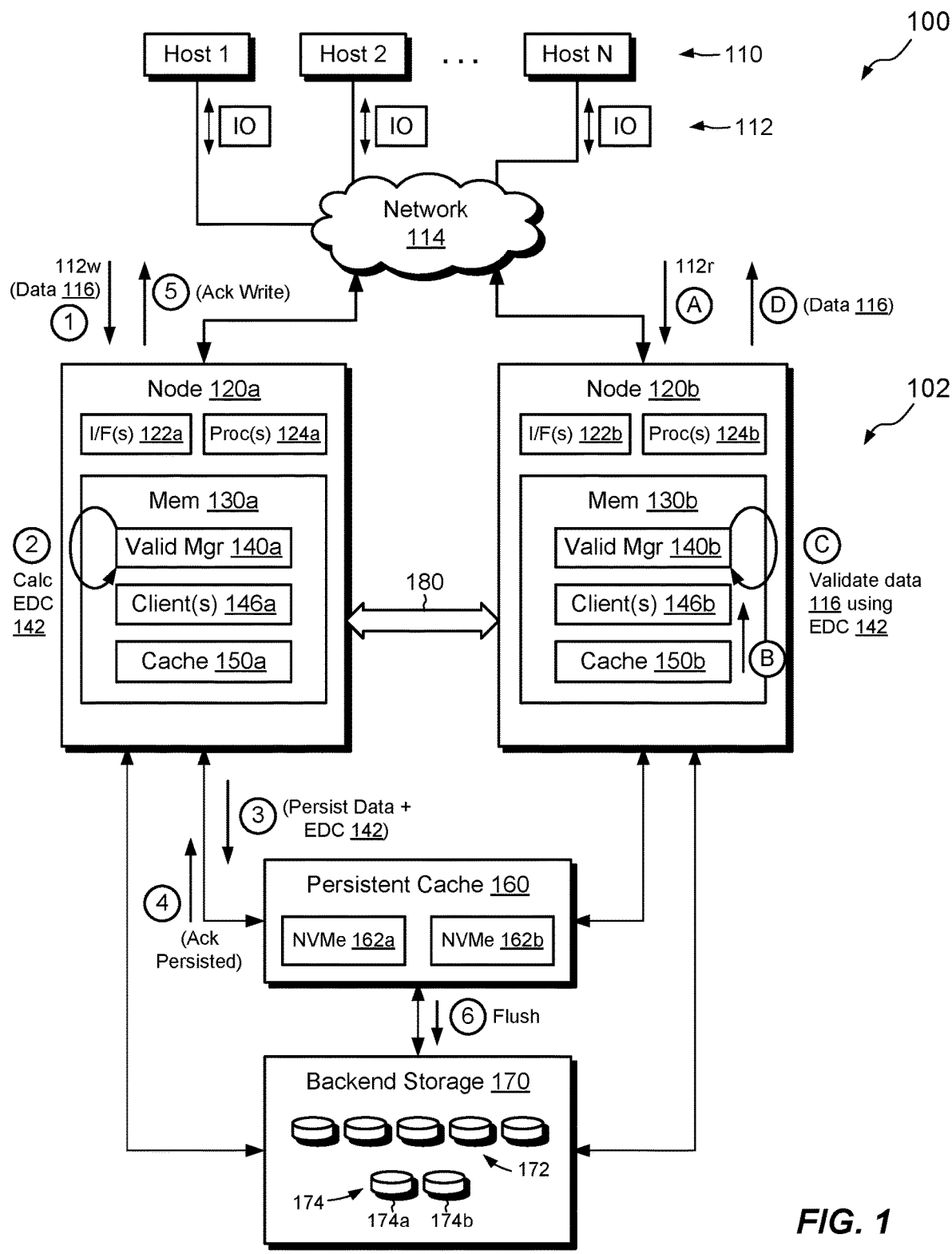
FIG. 1 is a block diagram of an example environment in which embodiments of the improved technique can be practiced.

FIG. 1 shows an example environment 100 in which embodiments of the improved technique can be practiced. Here, multiple host machines 110 access a data storage system 102 over a network 114. The data storage system 102 includes multiple processing nodes, such as a first node 120a and a second node 120b, a persistent cache 160, and backend storage 170. The persistent cache 160 may include high-speed, non-volatile memory (e.g., NVMe™) and may be configured in a mirrored arrangement (i.e., RAID-1, where RAID is an acronym for Redundant Array of Independent Disks). Each side 162a or 162b of the persistent cache 160 is configured to store a redundant copy of contents of the other side. Although the persistent cache 160 is shown separately from the nodes 120, it may alternatively be implemented within the nodes 120. For instance, NVMe 162a may be provided within the first node 120a and NVMe 162b may be provided within the second node 120b. Various arrangements are contemplated.

The backend storage 170 may include magnetic disk drives, electronic flash drives, solid-state drives and/or the like, which may also be RAID-protected. For example, persistent storage 170 may include storage drives 172 for storing user data, e.g., in a RAID-5 (rotating parity) arrangement, as well as storage drives 174 for storing certain metadata, e.g., in a RAID-1 (mirror) arrangement. The drives 174 in the mirror arrangement may include a first disk drive 174a and a second disk drive 174b, which are configured to redundantly store the same metadata. Although only a single RAID-5 array and a single RAID-1 array are shown, backend storage 170 typically includes many arrays of each kind. Also, the particular RAID arrangements should be regarded as illustrative rather than limiting. For instance, user data and metadata may each be stored in other types of RAID arrangements from those shown, or even without RAID protection. Although the term "disk drive" is used herein as a general term to describe storage devices, one should appreciate that no identifiable "disk" need be present. For example, a disk drive may be provided in the form of an SSD, even though the SSD may include no disk or other moving parts.

The processing nodes 120 may be provided as circuit board assemblies or blades, which plug into a chassis that encloses and cools the nodes 120. The chassis (not shown) has a backplane for interconnecting the nodes 120, and additional connections may be made among nodes 120 using one or more cables, such as cable 180. In some arrangements, a host application runs directly on the nodes 120 rather than on separate host machines 110, such that separate host machines 110 need not be present. One should appreciate that no particular hardware configuration is required, though, and that there may be any number of nodes 120, including a single node, in any arrangement, and the node or nodes 120 can be any type of computing device capable of running software and processing host I/O's.

The processing nodes 120 may all be configured in a similar fashion. For example, each processing node 120 includes one or more communication interfaces 122 (e.g., 122a or 122b), a set of processing units 124 (e.g., 124a or 124b), and memory 130 (e.g., 130a or 130b). Each of the communication interface(s) 122 may include, for example, SCSI target adapters and/or network interface adapters for converting electronic and/or optical signals received over the network 114 to electronic form for use by the respective node 120. Each set of processing units 124 includes one or more processing chips and/or assemblies, such as numerous multi-core CPUs (central processing units). Each memory 130 includes both volatile memory, e.g., RAM (Random Access Memory), and non-volatile memory, such as one or more ROMs (Read-Only Memories), disk drives, solid state drives, and the like. Each set of processing units 124 and respective memory 130 together form respective control circuitry, which is constructed and arranged to carry out various methods and functions as described herein. Also, each memory 130 includes a variety of software constructs realized in the form of executable instructions. When the executable instructions are run by the respective set of processing units 124, the set of processing units 124 is made to carry out the operations of the software constructs. Although certain software constructs are specifically shown and described, it is understood that each memory 130 typically includes many other software components, which are not shown, such as an operating system, various applications, processes, and daemons.

The network 114 may be any type of network or combination of networks, such as a storage area network (SAN), a local area network (LAN), a wide area network (WAN), the Internet, and/or some other type of network or combination of networks, for example. In cases where separate host machines 110 are provided, such hosts 110 may connect to the nodes 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The nodes 120 are configured to receive I/O requests 112 according to block-based and/or file-based protocols and to respond to such I/O requests 112 by reading or writing the storage 170.

As further shown in FIG. 1, the memory 130 of each node 120 "includes," i.e., realizes by execution of software instructions, a validation manager 140 (e.g., 140a or 140b), one or more clients 146 (e.g., 146a or 146b), and a volatile cache 150 (e.g., 150a or 150b). Each validation manager 140 is configured to calculate an EDC (error-detection code) on specified data or metadata and later to validate such data or metadata using the calculated EDC (e.g., by recalculating the EDC from the data or metadata and confirming that the new EDC matches or is otherwise consistent with the old EDC). Examples of EDCs include checksums, cryptographic hashes, descriptive numbers, and other codes, which are produced by an algorithm that generates the same output from the same input each time and typically (but not necessarily always) produces different output for different input.

The client(s) 146 running on each node 120 are configured to issue access requests, such as request to read or write user data and/or metadata. In the example of FIG. 1, client(s) 146 may include a namespace manager, a mapping manager, and/or some other component that requires access to volatile cache 150. Details of the namespace manager and mapper manager may be found in copending U.S. application Ser. No. 16/773,774, filed Jan. 27, 2020, and entitled "MANAGING UNCORRECTABLE USER DATA," the contents and teachings of which are incorporated herein by reference in their entirety.

Volatile cache 150 is realized in volatile memory, such as DRAM (Dynamic Random Access Memory). Each volatile cache 150 (150a or 150b) is addressable in pages, which may be uniformly sized. In an example, the page size of the volatile cache 150 matches the block size of the data storage system 102, where a "block" is the smallest unit of allocatable storage space. Pages of volatile cache 150 may also be referred to herein as "buffer caches."

In example operation, the host machines 110 issue I/O requests 112 to the data storage system 102. Nodes 120 receive the IO requests 112 at the respective communication interfaces 122 and initiate further processing. The I/O requests 112 may be directed to data objects hosted by the data storage system 102, such as LUNs (Logical UNits), file systems, virtual machine disks, and the like. I/O requests 112 may arrive at either of the nodes 120, with such nodes processing the I/O requests 112 in an active-active arrangement.

In accordance with improvements hereof, the data storage system 102 protects user data in an end-to-end fashion. The encircled numerals in FIG. 1 depict an example sequence for ensuring such data protection. At (1) (with (#) indicating an encircled numeral), node 120a receives a write request 112w from a host application, e.g., from a host 110. The write request 112w specifies user data 116 to be written to a specified location in the data storage system 102. For example, the data 116 may be directed to a specified offset of an identified LUN, to a specified range of a specified file, or the like.

Upon receiving the data 116, node 120a promptly applies protection to the data. As shown at (2), the validation manager 140a calculates an EDC 142 of the specified data 116. At (3), the validation manager 140a directs both the user data 116 and the calculated EDC 142 to be persisted in the persistent cache 160. Preferably, both sides 162a and 162b of the persistent cache 160 store both the data 116 and the EDC 142 in separate locations, such that a single write error does not affect both the data 116 and its EDC 142. In some arrangements, node 120a also places data 116 in one or more buffer caches of volatile cache 150a and creates a descriptor for that buffer cache, with the descriptor storing the EDC 142. Node 120a may also send the descriptor to node 120b for storage in volatile cache 150b, such that both active-active nodes 120 can maintain coherency between caches 150a and 150b.

At (4), the persistent cache 160 acknowledges successful persistence of both the data 116 and the EDC 142. At (5), and only after the persistent cache 160 acknowledges such persistence, node 120a acknowledges fulfillment of the write request 112w back to the requestor, e.g., the requesting host application. Significantly, acknowledgement of the write request 112w at (5) is provided only after both the user data 116 and its EDC 142 have been persistently stored in the data storage system 102.

At (6), which may occur sometime later, the user data 116 and its EDC 142 may be flushed to backend storage 170. In some examples, user data 116 is flushed in a data transaction and EDC 142 is flushed in a separate metadata transaction. Accordingly, the user data 116 and its EDC 142 may be stored in different locations of backend storage 170. The user data 116 and the EDC 142 may remain in backend storage 170 for an indefinite amount of time.

At some later point, a host application requests the same user data 116 as was previously written. An example sequence for reading such user data 116 is indicated by the encircled letters. At (A), node 120b receives a read request 112r specifying the user data 116, e.g., by identifying the above-described offset of an identified LUN, the specified range of the specified file, or the like. At (B), node 120b obtains the specified data 116 and its EDC 142. For example, node 120b first checks its volatile cache 150b for the specified data 116 and EDC 142. If the data is not found in the volatile cache 150b, node 120b checks the persistent cache 160. If the data is not found in the persistent cache 160b, node 120b fetches the data 116 and EDC 142 from backend storage 170.

At (C), validation manager 140b validates the obtained user data 116 using the associated EDC 142. For example, validation manager 140b freshly calculates a new EDC from the obtained user data 116 and compares the new EDC with the one it obtained during step (B). If the two EDCs are consistent, e.g., if they match, then the data 116 is successfully validated.

At (D), node 120a returns the validated data 116 to the requestor, e.g., the requesting host application. The read request 112r is thus fulfilled.

It is possible that validation at (C) might not succeed. For example, the user data 116 or its EDC 142 may have become corrupted over time, due to media errors, software errors, or other errors. Should this be the case, validation manager 140b may invoke an error handler (not shown), which may attempt to correct or remediate the error.

As thus described, the data storage system 102 applies protection to data 116 at its point of entry (e.g., at (1)) and validates the data 116 using the applied protection at its point of exit (e.g., at (D)), ensuring that the data returned in response to a read request is free of errors. Such data protection is both effective and efficient.

Figure 2:
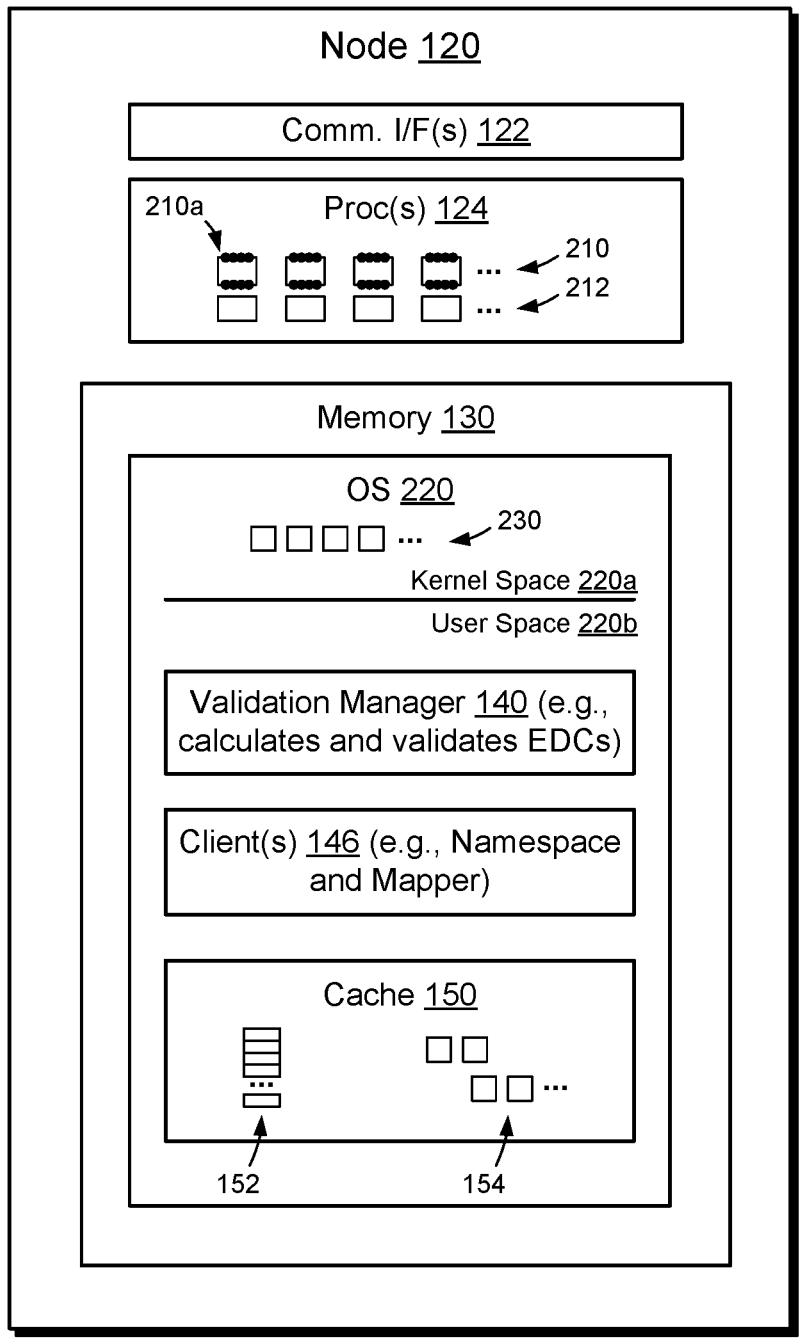
FIG. 2 is a block diagram of an example processing node of FIG. 1 in additional detail.

FIG. 2 shows an example node 120 of FIG. 1 in additional detail and illustrates how even greater efficiency may be achieved. Node 120 is intended to be representative of nodes 120a and 120b of FIG. 1. There is no requirement that all nodes 120 be strictly identical, however. Here, the set of processing units 124 is seen to include multiple CPUs 210 and associated local memory 212. Some elements of local memory 212 may be dedicated to respective CPUs 210, such as local registers or cache. Other elements of local memory 212 may be common to multiple CPUs, such as the CPUs on a single chip or the CPUs sharing a single socket. Although the CPUs 210 may be extremely fast, long delays may be involved in moving data into the local memory 212. Such delays may be on the order of hundreds of CPU instruction cycles.

Volatile cache 150 as shown in FIG. 2 is seen to include both cache descriptors 152 and buffer caches 154. Each buffer cache 154 is associated with a respective cache descriptor 152, which includes information about the buffer cache 154, such as an EDC 142 of the buffer-cache contents, clean/dirty status of the buffer cache, and other information.

As still further shown in FIG. 2, node 120 may run an operating system (OS) 220, such as Linux, Windows, or UNIX. The OS 220 may include kernel space 220a and user space 220b as separate regions of memory 130. Kernel space 220*a* may include kernel buffers 230. User space 220*b* may include the above-described validation manager 140, client(s) 146, and volatile cache 150. Although a single user space instance 220*b* is shown, node 120 may run multiple userspace instances simultaneously, over a single kernel. Also, any number of such userspace instances may be provided in respective containers, such as Docker containers.

The arrangement of FIG. 2 promotes efficiency when securely processing write requests. For example, in responding to a write request 112*w*, node 120 ingests user data 116 into one or more kernel buffers 230 in kernel space 220*a* and proceeds to transfer the user data 116 from the kernel buffers 230 to one or more buffer caches 154 in user space 220*b*. Kernel buffers 230 and buffer caches 154 need not be the same size. Although the transfer from kernel buffers 230 to buffer caches 154 may be directed by the validation manager 140 at the software level, the physical transfer may be implemented by a particular CPU 210*a* at the machine level. For example, CPU 210*a* loads the contents of one or more kernel buffers 230 into its local memory 212 and then places those contents into one or more buffer caches 154.

In accordance with some embodiments, CPU 210*a* calculates the EDC 142 of user data 116 during the transfer from kernel buffers 230 to buffer caches 154. For example, while the memory 212 is holding the user data 116 pending placement of the user data into the buffer caches 154, CPU 210*a* calculates the EDC 142 from the user data 116. Proceeding in this manner leverages the local presence of the user data 116 in the CPU memory 212 and avoids the need to separately load the user data 116 to calculate the EDC 142. This optimization thus saves hundreds of CPU cycles and promotes overall efficiency.

In some examples, the CPU 210*a* also leverages the local presence of user data 116 to perform pattern detection. For example, the CPU 210*a* checks the user data 116 for well-known patterns, such as all 0's, all 1's, and the like, and marks appropriate metadata to indicate any detected patterns.

When placing the contents of kernel buffers 230 into buffer caches 154, node 120 also updates one or more cache descriptors 152 associated with the buffer caches 154. For example, node 120 stores EDCs 142 calculated from the contents of the buffer caches 154 in respective cache descriptors 152. As previously described, node 120 may also synchronize the cache descriptors 152 with those on the other node or nodes 120.

The arrangement of FIG. 2 also promotes efficiency when processing read requests. For example, in responding to a read request 112*r*, CPU 210*a* (or any other CPU 210) may transfer the requested user data 116 into kernel buffers 230, such that the user data 116 may be returned to the originating requestor (e.g., a host application). In performing this transfer, CPU 210*a* loads the requested user data 116 and its EDC 142 into the local memory 212. Advantageously, CPU 210*a* leverages the local presence of the user data to validate the user data 116 using the EDC 142. For example, CPU 210*a* recalculates the EDC 142 from the user data 116 and compares the new EDC 142 with previous EDC. If the two EDCs match or are otherwise consistent, the user data 116 is successfully validated. Otherwise, the node 120*a* may invoke an error handler.

In the manner described, both the calculation of EDCs from user data 116 and the validation of user data 116 using EDCs are performed with minimal latency and at very low computational cost. Rather than consuming hundreds of instruction cycles for loading data, the acts of calculating EDCs and validating user data are performed quickly and efficiently, without the need to perform additional expensive loads into local memory 212.

FIGS. 3-9 show example methods that may be carried out in connection with the environment 100. The depicted methods are typically performed, for example, by the software constructs described in connection with FIG. 1, which reside in the memory 130 of one or both processing nodes 120 and are run by one or both sets of processors 124. The various acts of the depicted methods may be ordered in any suitable way. Accordingly, embodiments may be constructed in which acts are performed in orders different from those illustrated, which may include performing some acts simultaneously.

Figure 3:
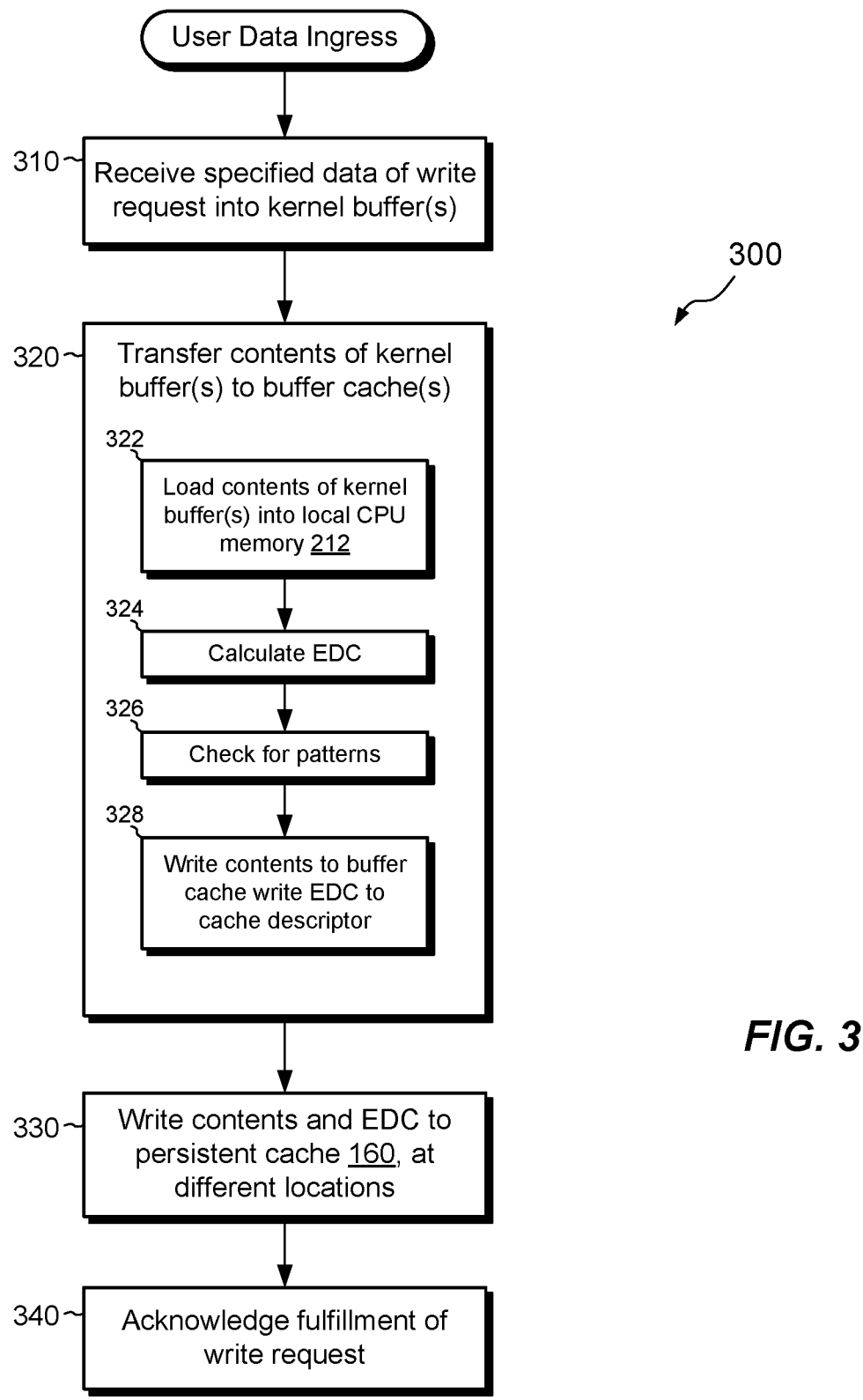
FIG. 3 is a flowchart showing an example method of managing user data ingress in the environment of FIGS. 1 and 2.

FIG. 3 shows an example method 300 of managing data protection during user data ingress, e.g., for securely ingesting user data into the data storage system 102 in response to write requests. Starting at 310, node 120 receives specified data 116 of a write request 112*w* into one or more kernel buffers 230 (FIG. 2).

At 320, node 120 transfers contents of said one or more kernel buffers 230 to one or more buffer caches 154. As part of this transfer, the following acts may be performed. At 322, a CPU such as CPU 210*a* loads the user data 116 from said one or more kernel buffer(s) into local CPU memory 212. At 324, CPU 210*a* calculates an EDC 142 of the user data 116. CPU 210*a* may also check, at 326, for well-known patterns, such as all 0's or all 1's. At 328, CPU 210*a* writes the user data 116 to a buffer cache 154. At this time, CPU 210*a* also writes the calculated EDC 142 to a cache descriptor 152 associated with the buffer cache 154. If greater than one buffer cache 154 is needed to accommodate the user data 116, a different EDC 142 may be calculated for each such buffer cache 154 and stored in a respective cache descriptor 152. Also, a different pattern detection may be run for the data to be transferred to each buffer cache.

Continuing to 330, node 120*a* writes the buffer cache(s) 154 and EDC(s) 142 to the persistent cache 160. In an example, the contents of each buffer cache 154 and its associated EDC 142 are stored apart from each other, i.e., in different locations of the persistent cache 160.

At 340, with the user data 116 and the associated EDC (or EDCs) persisted, node 120 acknowledges fulfillment of the write request 112*w*. In this manner, node 120 waits for both the user data 116 and the EDC(s) 142 to be persisted before acknowledging the write request 112*w*, thus ensuring that the write is not accepted into the data storage system 102 until the user data 116 is both persisted and protected. Also, the acts of calculating the EDC(s) and detecting common patterns are performed without requiring additional loads of user data into CPU memory 212, thus improving efficiency.

Figure 4:
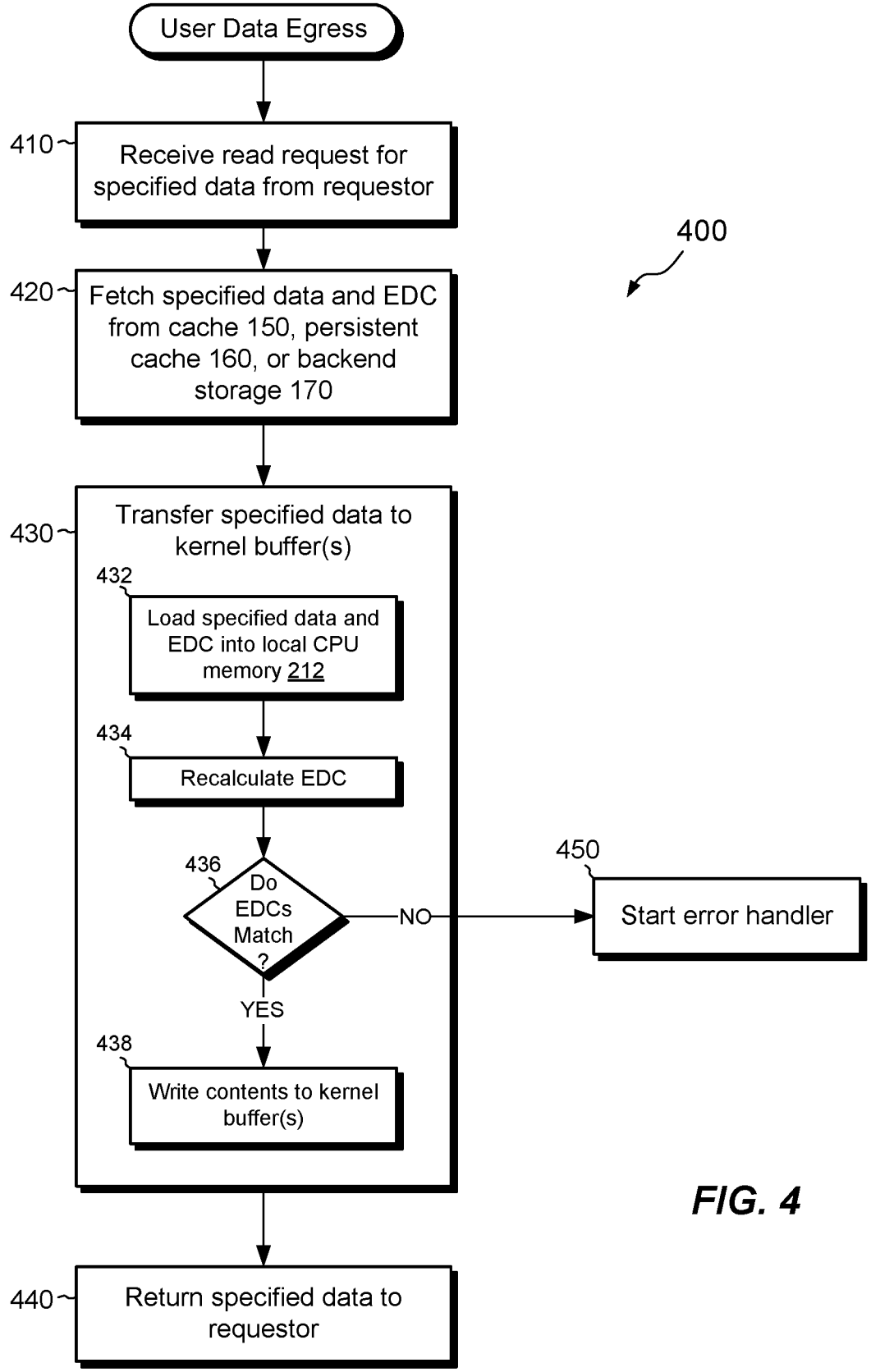
FIG. 4 is a flowchart showing an example method of managing user data egress in the environment of FIGS. 1 and 2.

FIG. 4 shows an example method 400 of managing data protection during data egress, e.g., for securely returning user data from the data storage system 102 in response to read requests. At 410, a node 120 receives a read request 112*r* from a requestor, such as a host application. The read request 112*r* specifies particular user data 116 to be read. Such data may be identified based on a specified offset of an identified LUN, a specified range of a specified file, or the like.

At 420, the node 120 fetches the specified user data 116 and its associated EDC(s) 142. The user data 116 and EDC(s) 142 may be found in the volatile cache 150, in the persistent cache 160, and/or in the backend storage 170. In an example, the node 120 obtains the user data 116 without validation, i.e., without first confirming the validity of EDC(s) for the user data 116 as obtained.

At 430, node 120 transfers the user data 116 as obtained at 420 to one or more kernel buffers 230. In the process of transferring the user data 116, for example, node 120 also validates the user data 116. For instance, at 432 a CPU 210a loads the user data 116 into its local CPU memory 212. At 434, CPU 210a recalculates the EDC(s) 142 from the user data 116. If the size of the user data 116 is greater than the size of a buffer cache 154, the CPU 210a recalculates an EDC 142 for each buffer-cache-sized increment of user data 116. At 436, the CPU 210a determines whether the recalculated EDC(s) are consistent with (e.g., match) the EDC or respective EDC(s) obtained at 420. If so, then at 438 CPU 210a writes the user data 116 to one or more kernel buffers 230 and, at 440, the user data 116 is returned to the requestor. If not, then operation proceeds to 450, whereupon an error handler is started. In the manner described, user data 116 is returned to the requestor only if the data can be successfully validated. Also, the act of validating the user data 116 is performed without requiring an additional load of the user data into CPU memory 212, further promoting efficiency.

Figure 5:
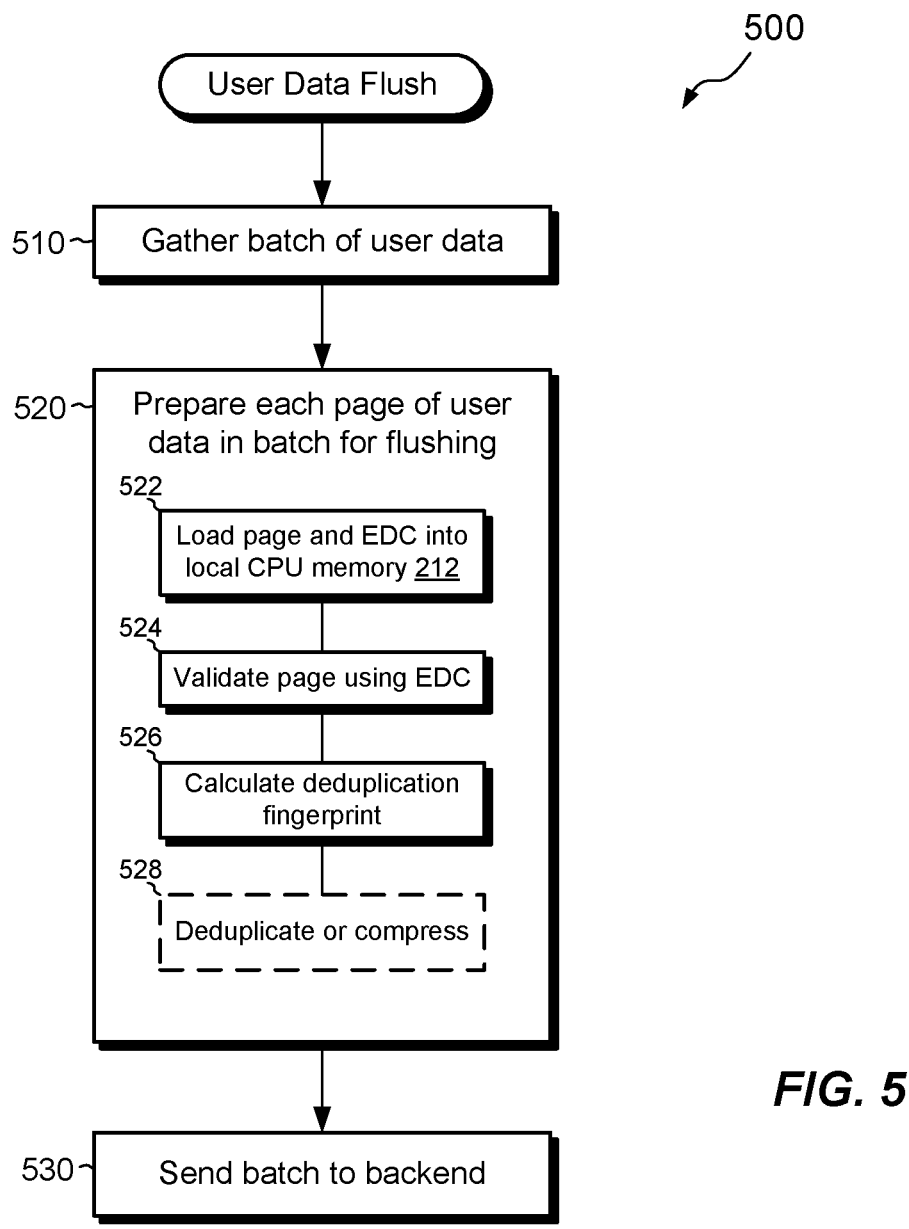
FIG. 5 is a flowchart showing an example flushing operation for user data in the environment of FIGS. 1 and 2.

FIG. 5 shows an example method 500 of flushing user data, e.g., for securely placing user data 116 in backend storage 170. The method 500 is an example of the flush operation described in connection with act (6) of FIG. 1.

At 510, node 120 gathers a batch of user data 116, e.g., a batch of one or more buffer caches 154 that store user data 116 in the volatile cache 150. The batch may include one or more elements of user data, including elements received in different write requests.

At 520, node 120 prepares each page of user data in the batch for flushing. For example, at 522 a CPU such as CPU 210a loads a current page of user data 116, e.g., as stored in a current buffer cache 154, into local CPU memory 212. CPU 210a may also load the EDC 142 of the current page into CPU memory 212. At 524, CPU 210a validates the current page using the obtained EDC 142, e.g., by recalculating the EDC and confirming that the recalculated EDC is consistent with the EDC just obtained. In some examples, CPU 210a also at this time calculates a deduplication fingerprint at 526. The deduplication fingerprint may later be used by the node 120 when performing data deduplication. As is known, data deduplication is a process whereby data blocks are matched based on fingerprints and redundant blocks are replaced with pointers to generally a single, retained block. Calculating the deduplication fingerprint at this time provides yet a further optimization, as an additional expensive load of a page of user data may be avoided, along with the associated delays. In some examples, as shown at 528, CPU 210a may perform deduplication or compression on the current page of data, benefiting again from the presence of the page in local memory 212.

At 530, after preparing each page of user data 116 for flushing, node 120 sends the batch of pages and their EDCs to backend storage 170, where they may be placed in RAID-protected devices.

FIG. 6 shows an example method 600 of managing data protection during user metadata ingress, e.g., for securely creating and persisting new metadata transactions. Unlike user data 116, which is generally received by the data storage system 102, metadata is generally created, rather than received. With this in mind, metadata ingress refers to the formation and initial persistence of generated metadata.

The method 600 of metadata ingress starts at 610, whereupon node 120 opens a new transaction a metadata operation. The transaction may involve multiple pages of metadata that should ideally be created or updated together, i.e., atomically, to maintain metadata consistency. To provide a simple example, a change that adds a new block of data to file may involve metadata changes to an inode of the file as well as to mapping pointers used to map the file's contents. Such changes should preferably be made together in a single metadata transaction.

At 620, node 120 identifies and loads the affected metadata pages into respective buffer caches 154. If any of the affected metadata pages are loaded from persistent cache 160 or from backend storage 170, node 120 may perform validation on such pages. Such validation will be described in connection with FIG. 7, which addresses metadata egress.

At 630, node 120 forms new metadata pages for the transaction in respective buffer caches 154. Forming new metadata pages may involve modifying existing metadata pages and/or providing wholly new metadata pages, as determined by the needs of the particular transaction. In an example, changes to metadata pages already residing in buffer caches 154 proceed without performing further validation.

At 640, a new EDC 142 is calculated for each new or modified metadata page of the transaction. Also, a generation number associated with each metadata page may be incremented for each modified page. For example, each metadata page has an associated generation number, which may be stored in a header of the metadata page, and which may be incremented monotonically each time the metadata page is changed.

In some examples, node 120 may use simplified EDCs for metadata, or for certain metadata, with the goal of reducing computational burdens of validating metadata that may be frequently accessed. Such EDCs may include simple codes that identify the type of metadata, and the codes may reside in the page header. Simple validation may thus be performed at little computational cost and without the need to access an EDC from a separate location. In some examples, simplified EDCs may be used as a replacement for checksums or other more complex EDCs. In other examples, simplified EDCs may be used in addition to checksums and the like, i.e., both types of EDCs may be provided for certain metadata pages, with simplified EDCs used when justified by computational constraints and more complex EDCs used when needed for more thorough checking.

At 650, node 120 commits the transaction by atomically writing each of the constituent metadata pages to persistent cache 160. Node 120 also writes associated EDCs and generation numbers, which may be included within the persisted metadata pages or provided separately. Once the transaction is committed, the metadata changes it contains are persisted. They are also secured using the associated EDCs. The persisted metadata pages may later be flushed to backend storage 170, to be persisted in a more permanent manner.

FIG. 7 shows an example method 700 of managing data protection during user metadata egress, e.g., for securely responding to a request from a client 146 to obtain a page of metadata. At 710, node 120 processes a request from a client 146 (e.g., namespace or mapper) to obtain a specified page of metadata. The requested page of metadata may reside in volatile cache 150, persistent cache 160, and/or backend storage 170.

At 720, node 120 selectively performs validation, depending on whether node 120 finds the requested metadata page in volatile cache 150 or in persistent storage 160 or 170. If the requested metadata page is found in the volatile cache 150, node 120 does not perform validation on the page, thus saving considerable time. If the requested metadata page is found in persistent cache 160 or in backend storage 170, however, then node 120 may proceed to validate the page. In an example, node 120 performs a simplified and efficient validation of the page. Such validation may involve accessing a simplified EDC for the page (e.g., as read from the page's header) and confirming its accuracy.

Assuming that the metadata page is obtained from persistent cache 160 or backend storage 170 and further assuming that node 120 determines that the metadata page is corrupted, then at 730 node 120 may perform a read-verify operation in an attempt to address the corruption. The read-verify operation involves reading the metadata page from both sides of a mirror, meaning from both NVMe 162a and NVMe 162b if the page is found in persistent cache 160, or from both drives 174a and 174b if the page is found in backend storage 170. When obtaining both versions of the page, node 120 checks whether the generation numbers on the two versions match. If the generation numbers do not match, the read-verify replaces the older version, having the smaller generation number, with the newer version, having the larger generation number. The operation may also replace any old versions found elsewhere in the system. If the generation numbers do match, however, then other error handling may be invoked. In the manner described, selective and efficient metadata validation is thus performed during metadata egress.

Figure 8:
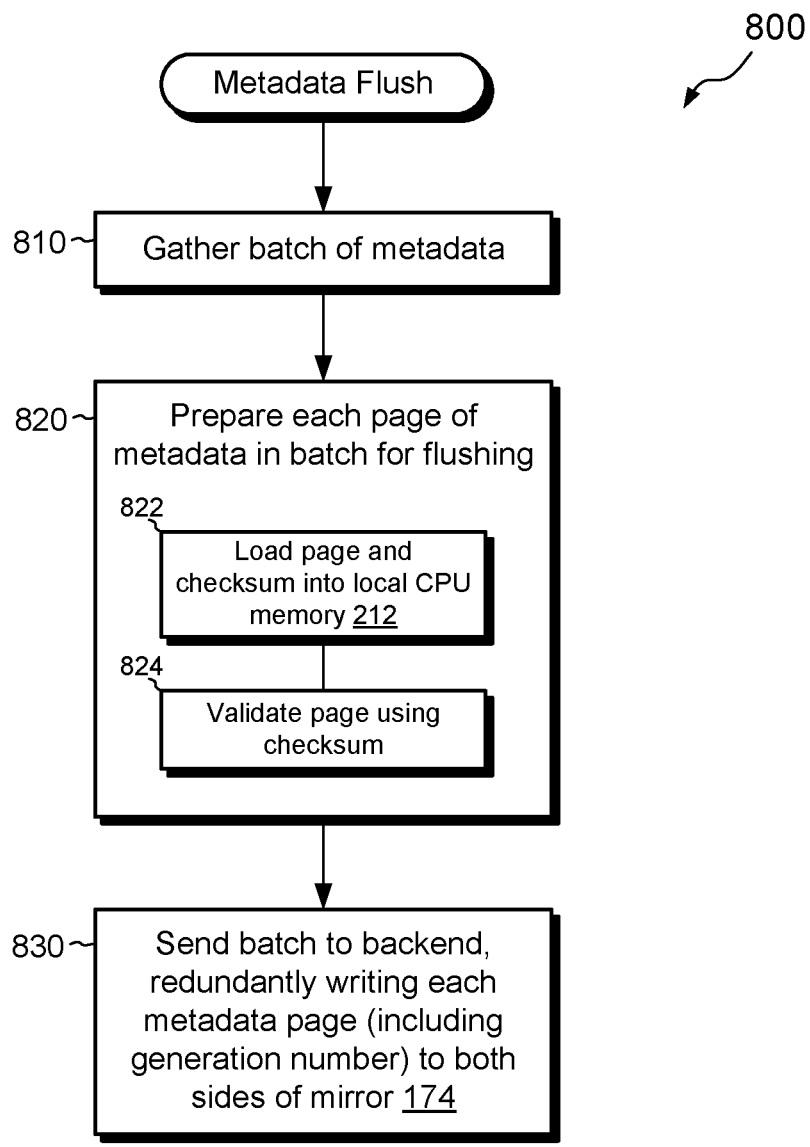
FIG. 8 is a flowchart showing an example flushing operation for metadata in the environment of FIGS. 1 and 2.

FIG. 8 shows an example method 800 for flushing metadata, e.g., for securely placing metadata in backend storage 170. At 810, node 120 gathers a batch of metadata, such as multiple pages of metadata that belong to one or more committed transactions. At 820, node 120 prepares each page of metadata in the batch for flushing. For example, at 822 a CPU such as CPU 210a loads the page and its checksum into local CPU memory 212. Here, an actual checksum may be used instead of a simplified EDC. At 824, the CPU 210a validates the page using the checksum. At 830, node 120 sends the batch to backend storage 170, redundantly writing each metadata page of the batch to both sides of the mirror, e.g., to both disk drives 174a and 174b. The flushed metadata pages may contain respective generation numbers, to allow for later checking and read-verify correction in the event that corruption is detected.

Figure 9:
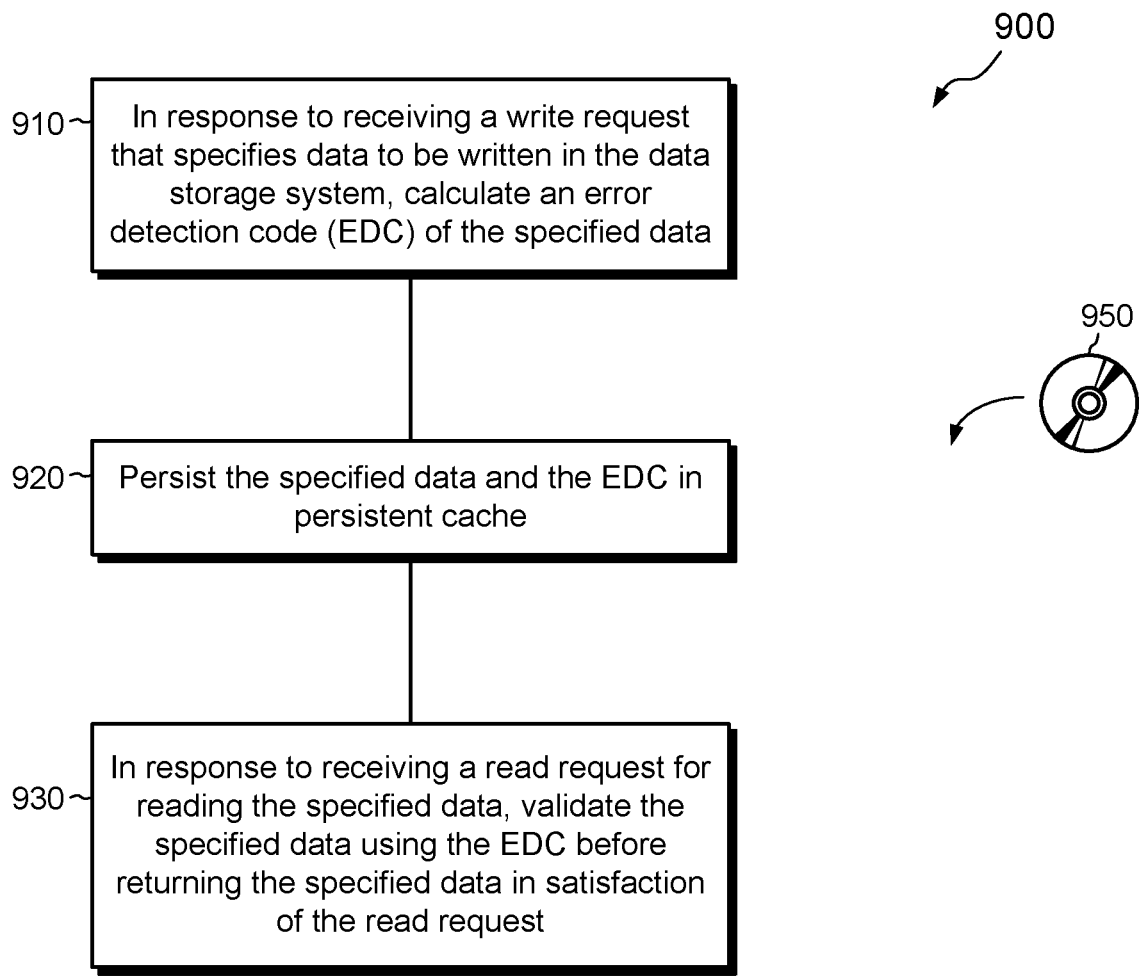
FIG. 9 is a flowchart showing an example method of protecting data in the environment of FIGS. 1 and 2.

FIG. 9 shows an example method 900 for protecting data in a data storage system, such as the one shown in FIG. 1, and provides a partial summary of some of the features already described. At 910, in response to receiving a write request 112w that specifies data 116 to be written in the data storage system 102, an error detection code (EDC) 142 of the specified data 116 is calculated. At 920, the specified data 116 and the EDC 142 are persisted in a persistent cache 160. At 930, in response to receiving a read request 112r for reading the specified data 116, the specified data 116 is validated using the EDC 142 before the specified data 116 is returned in satisfaction of the read request 112r.

An improved technique has been described for promoting end-to-end data protection in a data storage system 102. The technique includes calculating a checksum or other error-detection code (EDC) 142 on data 116 upon data ingress, e.g., in response to the storage system 102 processing a write request 112w, and validating the data 116 using the EDC 142 upon data egress, e.g., in response to the storage system 102 processing a read request 112r. The improved technique applies protection to data 116 at its point of entry and validates the data 116 using the applied protection at its point of exit, ensuring that the data returned in response to the read request 112r is free of errors. The disclosed technique thus performs validation selectively and efficiently, avoiding the long delays and computational burdens often associated with prior approaches.

Having described certain embodiments, numerous alternative embodiments or variations can be made. For example, although the described embodiments respond to reads and writes from a host application, this is merely an example. Alternatively, reads and writes may originate from other applications, such as those for performing data replication, data migration, backup, and the like. Thus, the disclosed embodiments are not limited in their use to host applications.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 950 in FIG. 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of protecting data in a data storage system, the method comprising:
   in response to receiving a write request that specifies data to be written in the data storage system, calculating an error detection code (EDC) of the specified data;
   persisting the specified data and the EDC in persistent cache; and
   in response to receiving a read request for reading the specified data, validating the specified data using the EDC before returning the specified data in satisfaction of the read request,
   wherein the write request is received from a host application, and wherein the method further comprises acknowledging fulfillment of the write request to the host application only after persisting the specified data and the EDC.

2. The method of claim 1, wherein receiving the write request includes:
   ingesting the specified data into a set of kernel buffers in kernel space of the data storage system; and
   transferring the specified data from the set of kernel buffers to a set of buffer caches in userspace of the data storage system.

3. The method of claim 2, wherein calculating the EDC of the specified data is performed while transferring the specified data from the set of kernel buffers to the set of buffer caches.

4. The method of claim 3, wherein calculating the EDC of the specified data includes:
   fetching, by a CPU (central processing unit) of the data storage system, the specified data from the set of kernel buffers into a local cache of the CPU; and
   calculating the EDC from the specified data in the local cache of the CPU.

5. The method of claim 2, further comprising, while transferring the specified data from the set of kernel buffers to the set of buffer caches, checking the specified data for any of a set of predetermined patterns.

6. The method of claim 2, wherein returning the specified data in satisfaction of the read request includes:
   transferring the specified data to a second set of kernel buffers in the kernel memory of the data storage system; and
   providing the specified data from the second set of kernel buffers to the host application,
   wherein validating the specified data is performed while transferring the specified data to the second set of kernel buffers.

7. The method of claim 6, wherein validating the specified data includes:
   calculating a checksum of the specified data; and
   confirming that the calculated checksum is consistent with the EDC.

8. The method of claim 1, further comprising performing a flushing operation to flush the specified data to backend storage, wherein the method further comprises validating the specified data while performing the flushing operation.

9. The method of claim 8, wherein the method further comprises calculating a deduplication fingerprint of the specified data while performing the flushing operation.

10. The method of claim 8 wherein while performing the flushing operation, the method further comprises loading the specified data into local cache of a CPU of the data storage system, the CPU then performing the acts of:
    calculating a new checksum of the specified data from the specified data in the local cache;
    confirming that the new checksum is consistent with the EDC, and
    calculating a deduplication fingerprint of the specified data in the local cache.

11. The method of claim 1, further comprising:
    opening a transaction that specifies a set of changes in metadata of the data storage system;
    forming a set of metadata pages of the transaction;
    calculating a set of EDCs for the set of metadata pages; and
    committing the transaction by the set of metadata pages and the set of EDCs to the persistent cache.

12. The method of claim 11, further comprising:
    performing a flushing operation to flush the new metadata of the transaction to backend storage; and
    validating the new metadata while performing the flushing operation.

13. The method of claim 12,
    wherein performing the flushing operation includes writing the new metadata of the transaction in pages, the pages having associated generation numbers, and
    wherein writing the new metadata includes redundantly storing the pages in at least two disks of a mirrored array.

14. The method of claim 13, further comprising resolving differences between two instances of a page of metadata as read from two disks of the mirrored array by replacing an instance having a smaller generation number with an instance having a larger generation number.

15. The method of claim 12, further comprising processing a request to read an element of metadata from backend storage and, prior to returning the element of metadata in satisfaction of the request to read, validating the element of metadata.

16. The method of claim 12, further comprising processing a request to read an element of metadata from the persistent cache and, prior to returning the element of metadata in satisfaction of the request to read, validating the element of metadata.

17. A computerized apparatus, comprising control circuitry that includes a set of processing units coupled to memory, the control circuitry constructed and arranged to:
    in response to receipt of a write request that specifies data to be written, calculate an error detection code (EDC) of the specified data;
    persist the specified data and the EDC in persistent cache; and
    in response to receipt of a read request for reading the specified data, validate the specified data using the EDC before returning the specified data in satisfaction of the read request,
    wherein the control circuitry constructed and arranged to receive the write request is further constructed and arranged to ingest the specified data into a set of kernel buffers in kernel space of the data storage system and transfer the specified data from the set of kernel buffers to a set of buffer caches in userspace of the data storage system.

18. A computer program product including a set of non-transitory, computer-readable media having instructions which, when executed by control circuitry of a computerized apparatus, cause the computerized apparatus to perform a method of protecting data, the method comprising:
    in response to receiving a write request that specifies data to be written in the computerized apparatus, calculating an error detection code (EDC) of the specified data;

persisting the specified data and the EDC in persistent cache; and in response to receiving a read request for reading the specified data, validating the specified data using the EDC before returning the specified data in satisfaction of the read request, wherein receiving the write request includes ingesting the specified data into a set of kernel buffers in kernel space of the data storage system and transferring the specified data from the set of kernel buffers to a set of buffer caches in userspace of the data storage system.

19. The computer program product of claim 18, wherein calculating the EDC of the specified data is performed while transferring the specified data from the set of kernel buffers to the set of buffer caches.

20. The computer program product of claim 19, wherein the method further comprises, while transferring the specified data from the set of kernel buffers to the set of buffer caches, checking the specified data for any of a set of predetermined patterns.

* * * * *